3,197,164
ELECTRICAL COMPONENT SECURING MEANS
Claude A. Hansen, Federal Way, Wash.
Continuation of application Ser. No. 764,190, Sept. 29, 1958. This application July 16, 1964, Ser. No. 384,576
6 Claims. (Cl. 248—73)

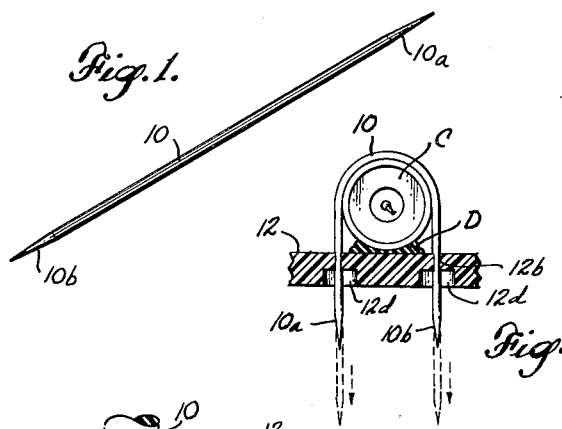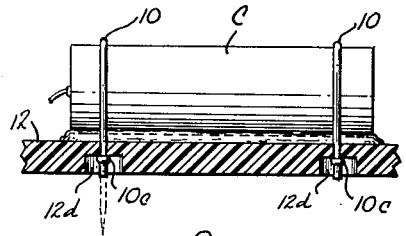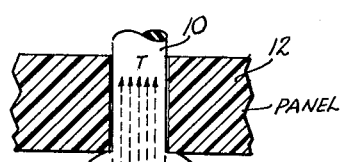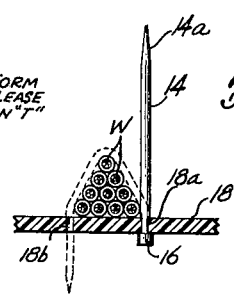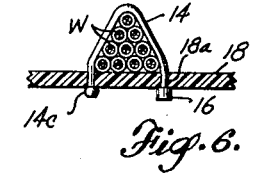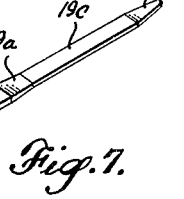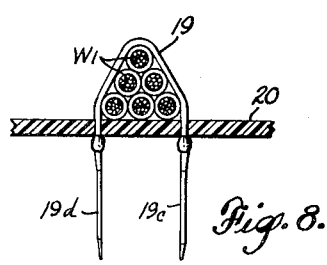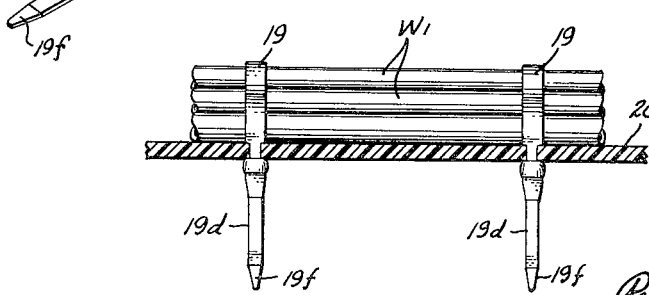

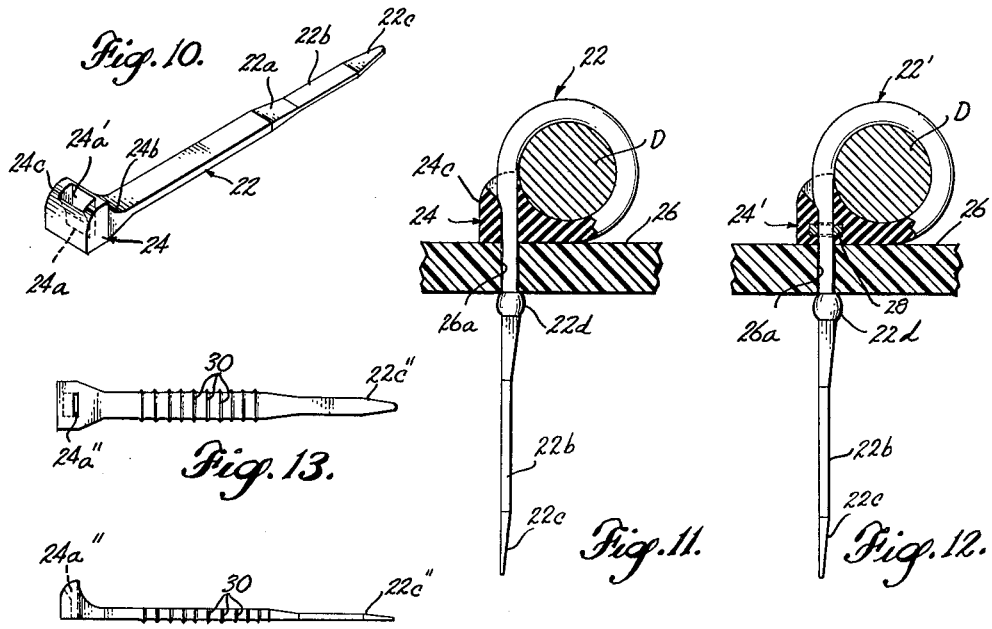
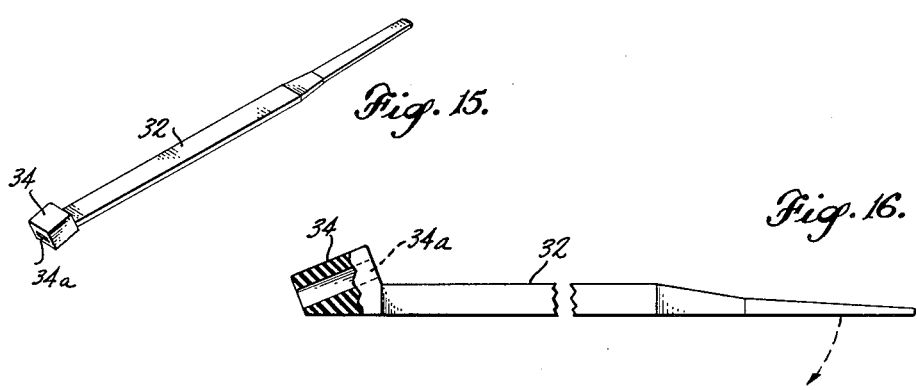

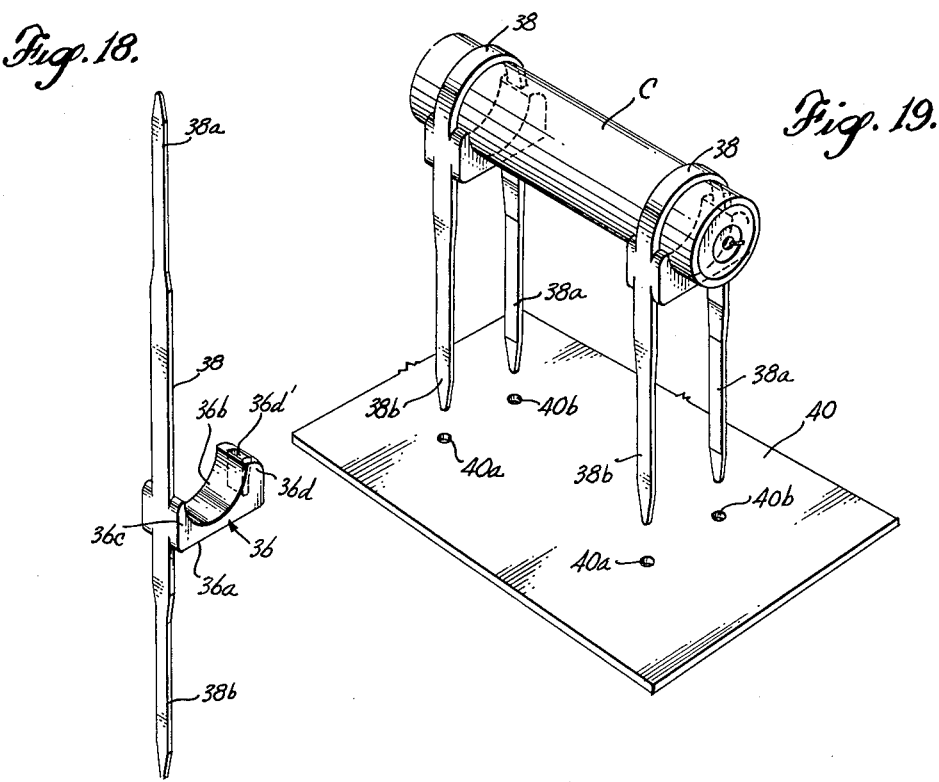

This application is a continuation of application Serial No. 764,190, filed Sept. 29, 1958.

This invention relates to new and improved means and techniques for securing together or to a backing panel components of electrical apparatus. For example, the invention is applicable to the tying or banding of wires together in bundles, to the securing of individual wires or a bundle of wires to a panel, to the securement of individual resistors, condensers and similar components to a panel, and similar applications. The term "panel" as herein used is intended to include panels as such and also any suitable rigid support or backing member to which electrical components may be secured. The invention is herein illustratively described by reference to the presently preferred forms thereof; however, it will be recognized that certain modifications and changes therein with respect to details may be made without departing from the essential features involved.

Heretofore, wires and bundles of wires have been secured together and to panels by use of string, wire, cable clamps or anchored fittings to which the wires could be lashed. All of these devices or techniques have proven unduly time consuming, however, particularly in applications requiring large numbers of fastenings, due of course to the necessity of tying knots or performing other relatively tedious operations usually under crowded space conditions. Moreover, the strings, wires, or clamps used could and sometimes did damage the insulation of the electrical wires being secured. In many instances the resulting work product appeared untidy and unworkmanlike.

Related types of problems have existed in connection with the mounting of condensers, resistors and other electrical or mechanical components on panels in electrical apparatus.

A broad object of this invention is to provide securing means and techniques generally overcoming the foregoing difficulties.

A related object is to provide a means for banding wires in a bundle or for bundling wires and securing the bundle to a panel, all with a minimum of effort, in a relatively short time and with a permanent and durable result.

A related object is to provide a securing means for wires and the other electrical components which is so constituted that even the severest of shock and vibration conditions will not loosen the securing means nor permit the components to move appreciably in relation to the panel or other physically related apparatus. In this connection the invention provides an inherent means for applying predetermind gripping and securing force, which force is retained continuously thereafter yet may be so controlled or limited in amount as to avoid cutting into or otherwise damaging wire insulation or relatively soft component casings.

A related specific object is to provide such a securing means which requires no knot tying operations and yet has the flexibility and adaptability of string or wire ties heretofore used, with respect to variations in size, shape and arrangement of the wires or other components to be bundled together or to be secured.

Still another object is to provide such a securing means which is relatively invulnerable to environments which normally corrode metal and which is not materially influenced by variations in temperature or other conditions, such as ozone concentration, under which electrical apparatus may be operated.

Still another object is to provide such a securing means of an electrical insulating nature permitting use thereof under crowded conditions without danger of grounding or shorting circuit parts.

A further object is securing means which will be as strong or stronger than the usual string-tie connections, and more durable.

With these and other objects in view, it will be seen that features of the invention reside in various embodiments and variations including, but not limited to: doubly tapered flexibly resilient strap-like elements of various configurations for securing wires and circuit components to panels having retaining apertures for such elements; strap-like elements with enlargements which serve as stops or which are apertured to provide retaining eye means with which to form a securing loop, either for tying wires into bundles or for securing to a panel individual wires, bundles of wires or electrical components circled tightly by the strap-like element; strap-like members having enlargements formed as combination cradling and retaining eye members by which cylindrical and other components may be mounted rigidly on and spaced from a panel; and others.

These and other features, objects and advantages of the invention, including the illustrated forms thereof together with modifications and equivalent forms will be evident to those skilled in the art on the basis of the following description by reference to the accompanying drawings.

FIGURE 1 is a perspective view of a simple embodiment of the invention wherein the strap-like element comprises a doubly tapered (i.e., tapered at both ends) member of flexibly resilient (i.e., rubber-like) material.

FIGURE 2 is an end view of an electrical circuit component such as a resistor or condenser being secured to a panel by a means such as that in FIGURE 1, with the panel being shown in cross section.

FIGURE 2a is a diagrammatic view illustrating the action by which the rubber-like securing element retains itself in place in a panel or other apertured member without necessity of tying knots or applying special clamps, stops or the like.

FIGURE 3 is a side view of the component being installed as in FIGURE 2, with the projecting ends of the securing elements trimmed off.

FIGURE 4 is a perspective view of a modified securing element having an enlargement on one end serving as a stop.

FIGURE 5 is an end view showing use of the element in FIGURE 4 to secure a bundle of wires to a panel, the panel being shown in section.

FIGURE 6 is a view corresponding to FIGURE 5 in which the securement has been completed and the projecting tapered end of the securing element trimmed off.

FIGURE 7 is a perspective view of a modified strap-like securing element particularly adapted for securing insulated wires to panels, either separately or in bundles.

FIGURE 8 is an end view showing the securing element of FIGURE 7 being applied to secure a bundle of insulated wires to a panel.

FIGURE 9 is a side view of the secured bundle shown in FIGURE 8.

FIGURE 10 is a perspective view of a modified securing element having an apertured enlargement on one end.

FIGURE 11 is a side view of the element shown in FIGURE 10 encircling a component and securing that component to a panel.

FIGURE 12 is a view similar to FIGURE 11, wherein the apertured enlargement has been modified to the extent of incorporating a grommet of metal or other rigid material.

FIGURE 13 is a top view of a variation of the securing element of FIGURE 10.

FIGURE 14 is a side view of the securing element shown in FIGURE 13.

FIGURE 15 is a perspective view of a securing element particularly adapted for tying wires into bundles without regard necessarily to the securing of those bundles by means of the same element to a panel.

FIGURE 16 is a side view of the securing element of FIGURE 15, in which the apertured enlargement has been broken away partly in section.

FIGURE 17 is a view at a somewhat reduced scale showing the element of FIGURES 15 and 16 formed in a loop and banding together a bundle of wires.

FIGURE 18 is a perspective view of a further modification in which the enlargement is located generally intermediate the ends of the strap-like element and is formed as a cradle.

FIGURE 19 is a perspective view showing an electrical resistor or condenser being secured to a panel by means of two of the elements of FIGURE 18.

FIGURE 20 is an end view of the component secured to the panel pursuant to the application in FIGURE 19.

FIGURE 21 is a perspective view of the secured component.

Referring to FIGURES 1 to 3, inclusive, the illustrated strap-like securing element 10 is formed of a flexibly resilient material such as a good grade of fairly soft vulcanized rubber. For aircraft and other critically exacting applications the material used in the securing element must, of course, measure up to certain standards with regard to such characteristics as tension properties, indentation properties as measured by a Durometer, aging resistance (i.e., minimal creep), heat resistance, low brittleness at reduced temperatures, tear resistance, and ability to withstand attack by ozone or other corrosive media usually or normally encountered in such applications. The art of formulating rubber material measuring up to high standards in these various respects is well known and requires no description or elaboration herein. Moreover, it is desirable that the securing element 10, as well as modifications thereof shown in other figures, be molded with relatively smooth surfaces free from flash. As will later appear, elements which are used for temporary ties or securements will have smoother surfaces, desirably, than elements which are molded and used for permanent securements.

In this first illustrated embodiment the securing means 10 comprises a relatively elongated rubber-like thong or strap 10 which in this instance is of circular cross section. The major cross section of the element extends throughout most of its length intermediate its ends and in this instance those ends are gradually tapered substantially to points, the tapered opposite end portions 10a and 10b being substantially identical. A panel 12 to which an electrical component C is to be secured by means of the straplike means 10 has two apertures 12a and 12b therein located at opposite sides of the component C with the latter placed in its desired position on the panel. These apertures are materially smaller in cross section than the major cross section of the member 10 intermediate its ends; however, the tapered end portions or points 10a and 10b may be inserted through these apertures in order to grasp the projecting ends on the opposite side of the panel. Once grasped, the ends of the member 10 may be stretched tight, hence reduced in cross section and may thereby be drawn readily through the apertures progressively until the major cross sectional portion of the member 10 passes through. Preferably the ends are drawn at substantially equal rates so as to avoid rotating the component C during the process of taking up slack in the member 10. The tightening of the member 10 looped around and gripping the component C against the panel 12 is preferably increased until the operator senses that the loop has been tightened with substantially all of the yield or stretch removed from the rubber. Under these conditions the stretched ends of the member 10 appear as in the dotted line showing in FIGURE 2. Upon release of those ends it will be found that the tension will remain in the loop portion of the strap 10 encircling the component C on the opposite side of the panel 12 because the redistribution of stresses in the rubber causes a very pronounced bulging action on the near side of the panel, forming stops which prevent withdrawal of the strap-like member back through the apertures 12a and 12b. These bulges or stop formations appear in FIGURES 2a and 3, being designated 10c.

The action by which this occurs is illustrated in FIGURE 2a, wherein the stretched-out member 10 appears in broken lines. The tension stress T in the stretched member is distributed over substantially the entire cross section thereof aligned with the area of the aperture 12a under these conditions. When the end 10b is released the tension stress still tends to persist in that same cross sectional area, aligned with the area of the aperture; however, resultant shortening of the portion of the member which lies on the near side of the aperture when the member is released causes it to thicken somewhat, thereby spreading the rubber laterally beyond the projected area of the aperture 12a, hence out of alignment with the tension stresses in the rubber. Now this excess peripheral rubber represents a collar or ring surrounding the rubber still under tension, and this collar or ring is thereby subjected to compression c. Because of Poisson's ratio the consequent shortening of the projecting end portion of the member due to persistent tension in the core region thereof causes expansion of the outer or ring material and produces the bulge formation 10c as illustrated. Because of this compression of the rubber-like material in the bulge it is thereby hardened or stiffened and forms a rigid and permanent stop preventing withdrawal of the member 10 back through the aperture. The end portion 10b may now be trimmed off if desired at or beyond the bulge 10c in order to avoid unnecessarily projecting elements.

Preferably the panel 12 is formed with recesses or pockets 12d in the side thereof opposite the components to be installed so that when the rubber ends are trimmed off beyond the stops 10c the latter will not project beyond the general surfaces of the panel (FIGURE 3). This produces a neat and workmanlike appearing product and provides protection for the stops.

In the illustrated technique for installing a component C by means of the securing members 10, two such members 10 are employed and two sets of apertures 12a and 12b. An additional number of securing members may be used, or only one if desired. In order to add to the security of the fastening a quantity of hardenable cement material D may be applied or interposed between the face of the panel 12 and the underside of the component C, the latter embedding itself so that as the material hardens it forms a rigid cradle and a bond to the panel. Various resinous, mastic or other compounds may be used for this purpose.

Referring to FIGURE 4, there is shown an alternative embodiment in which the strap-like securing member or thong 14 has an enlargement 16 on one end thereof, the opposite end being gradually tapered substantially to a point in the preceding embodiment. The enlargement 16 in this instance serves the purpose of a preformed stop or bulge on one end of the securing member 14. As shown in FIGURES 5 and 6, installation of this type of securing member is initiated by inserting the pointed end 14a of the member 14 through a first aperture 18a in the panel 18 from the side of the panel opposite that to which the electrical component such as the wires W are to be secured and drawing the member 14 through the aperture until the stop 16 abuts the panel face.

Thereupon the wires W are grouped together in a bunch or bundle and the thong 14 is looped around them and the pointed end 14a passed through the other aperture 18b. The projecting end is then grasped and the member 14 stretched and drawn progressively through the aperture 18b until the loop portion of the member 14 is under the required tension. Thereupon release of the free end of the member 14 causes the bulge 14c to form immediately adjacent the rim of the aperture 18b preventing withdrawal of the member back through the aperture. The pointed end of the member, 14a, may then be trimmed off as before (FIGURE 6). One disadvantage of this embodiment over the embodiment shown in FIGURE 1 is that drawing of the member 14 progressively through the aperture 18b as in FIGURE 5 produces a twisting action tending to rotate the bundle of wires W during the process. In the first described embodiment, however, by drawing on both ends of the member 10 simultaneously and to the same extent any rotational forces caused by the tightening action cancel each other out and there is no resulting tendency for the component C to rotate, nor for differences in tension on the two sides of the formed loop.

In both of the embodiments thus far described it will be recognized that a further factor of importance preventing withdrawal of the tensioned strap-like member in its installed condition, in addition to the described bulging action forming the stop, is the high frictional coefficient of a roughly surfaced good grade of rubber such as that which should be used in the manufacture of these securing means. Such frictional resistance to sliding or withdrawal of the thong back through the apertures not only increases the security of the mounting but also tends to help prevent a tendency for the secured component or wire to shift about in the grip of the loop. This effect would be considerably impaired if a more slidable and slippery material such as a fabric or the like were to be used on the surface of the securing means.

The fastening secured by the disclosed means is or may be considered permanent. In order to remove the securing means the strap-like members 10 or 14 may be cut and replaced with new ones. In some instances the bulged material may be stretched out again with the aid of pliers so that it may be worked back through the aperture for removal without cutting.

It will be seen that for many applications a circular cross-section securing member, such as 10 or 14, may be employed, whereas in others it is preferred that the securing member be relatively flat as in the embodiment shown in FIGURE 7. In this instance the strap-like securing means 19 is tapered at both ends and has a substantially uniform cross section extending over a large intermediate portion of its length. As a variation, instead of employing a continuous gradual taper at the opposite ends the taper occurs in two steps, first the steps 19a and 19b, which are adjoined respectively by the substantially untapered portions 19c and 19d continuing into the respective end portions 19e and 19f which taper substantially to a point. The taper occurs not only in thickness but also in width, for ease in the insertion of the ends of the member 19 through apertures in the panel 20, as shown in FIGURES 8 and 9. In this instance, the purpose of the member 19 is to secure a bundle of insulated wires W1 against the panel 20 and the purpose of employing a relatively flat or broad strap-like member 19 instead of a relatively small and round one is to increase the area of contact thereof with the wire insulation to avoid damage to the latter. Otherwise the same procedure of installation and the same action preventing withdrawal of the preliminarily stretched tying members 19 is employed as before.

It should be noted in passing that in every instance the apertures through the panel must be materially smaller than the major cross section of the securing member to be drawn therethrough so that the desired bulging and holding action will be obtained. For example, in the case of a round securing member 10 of 0.075 inch diameter, a suitable mounting hole size for a typical material used in the securing member is approximately 0.046 inch diameter, whereas a member 10 of 0.115 inch diameter and of similar material should have a mounting hold size of approximately 0.076 inch. It is desirable to employ an aperture form which is substantially the same as the cross sectional form of the securing member. However, this is not essential in every case because the resilient flexibility of the rubber-like material permits it to reform and fill out an aperture substantially which differs in form from the relaxed cross-sectional form of the securing member.

In FIGURE 10 there appears a special embodiment which may be used, for example, in the manner illustrated in FIGURE 11, namely as a means to grip and hold a wire or other electrical component and to secure that component to a panel by means of only one aperture in that panel. In this instance the securing member 22 is represented as a strap-like member 22 which carries, preferably as an integral part thereof, an apertured enlargement or head 24 at one end and is tapered in transitions 22a and 22c at its opposite end, the portions 22a and 22c being separated by a uniform portion of reduced size, 22b. The enlargement 24 has an aperture 24a extending therethrough in a direction generally transverse to the length of the relaxed and straightened strap-like member 22. One end 24a' of this aperture is flared out for ease of insertion of the end 22c to form a noose or loop. It is flared preferably in width and height. That side of the juncture between the enlargement 24 and the member 22 corresponding to the flared entrance 24a' is concavely rounded or filleted as indicated at 24b, the radius of curvature corresponding approximately to the desired radius of a securing loop formed by means of the securing member as shown in FIGURE 11. The enlargement projects laterally from only one flat side of the strap-like member, the other side being flush with the corresponding side of the enlargement. Moreover, that side wall of the aperture 24a which lies nearest the fillet 24b comprises a substantially flat or planar wall so that the strap-like member passing through the aperture enters and departs generally tangentially to the loop formed by the member. The flare at the entrance is therefore achieved by sloping the opposite aperture wall away from the wall just described. As a result of this general form of construction the apertured enlargement is not distorted materially in the installed condition of the member, thereby assuring snugness of fit of the strap-like portion in the aperture. The end 24c of the enlargement opposite the fillet 24b may also be gradually rounded as shown.

The installation of the member 22, 24 in FIGURE 10 in order to grip and secure an electrical component D to a panel 26 is self-evident from FIGURE 11 and from the previous description of the process of employing these rubber-like tying devices. Tension in the substantially straight portion 22 of the securing member is increased by progressively drawing the member through the aperture 26a until most of the stretch is removed from the member, whereupon release of its end causes the desired bulging action to form the stop 22d depicted. The substantially flat lower face of the enlargement 24 and the adjoining flush face of the member 22 present a substantially flat abutment surface which rests stably in contact with the adjacent face of the panel 26 and remains as such thereafter due to the residual tension in the member 22 drawing the panel and securing device together.

In FIGURE 12 there is illustrated the feature of a metal or other rigid material grommet 28 embedded in and forming part of the apertured enlargement 24'. Thus, when the strap-like member 22′ is passed through the aperture it must be constricted by a predetermined amount which is not varied as a result of any elasticity in the surrounding body of the enlargement, since the grommet itself is of rigid form. This means that is is possible even more successfully than in the form shown in FIGURE 11, to pretension the band 22′ in its encirclement around the element D, a bulge forming adjacent the grommet to maintain the tension. Thus, if the encircled element is to be secured to the panel 26 the process of so doing is simplified, being simply one of drawing the strap-like member progressively through the aperture 26a until the requisite tension is achieved in the strap-like member before its release to form the retaining bulge at the underside of the panel. In so doing it is not necessary to work the strap-like member around the component D at the same time the strap-like member is being drawn through the aperture in order to achieve uniform tension in the strap-like member throughout its length. This avoids the possibility of any subsequent redistribution of tension forces in the member 22′ which might occur if the tension were initially unequal in different portions surrounding the component, and which if it did occur might result in a relaxation to some degree of ultimate holding tension in the member and a lessening of the bulge effect. Of course, it will be evident that the component D may comprise a bundle of wires and that the sole purpose of the securing member 22, 24 may be to tie together those wires in a bundle without necessity of securing the bundle to a panel. In that instance the device is used simply as a tie or band, in which case the function of the grommet 28 becomes all the more important because it assures a positive holding action by eliminating the factor of stretchability of the body of material in the enlargement 24.

The modification shown in FIGURES 13 and 14 is generally similar to that of FIGURE 10 with the exception that in the latter two figures serrations or ridges 30 are provided on one flat side or face and on opposite side edges. Once the tapered end portion 22c″ has been inserted through the aperture 24a″ and a tight loop has been drawn around a component these ridges help to hold the tension therein. However, for most purposes these ridges are unnecessary since the inherent frictional characteristics of a roughly surfaced rubber compound when added to the bulge effect already provides the necessary holding action for most applications.

It has been mentioned that the embodiment shown in FIGURE 10 and its variation in FIGURES 13 and 14 may be used purely as a banding device for securing together wires or other components in a bundle without reference to attaching the same to a panel. FIGURES 15 and 16 illustrate a further modification intended especially for that purpose. In this instance the relative flat strap-like member 32 carries an apertured enlargement 34 in which the aperture 32a extends in a direction more nearly parallel to the extent of the strap, hence more nearly tangential to the loop formed thereby (FIGURE 17) regardless of variations in diameter of the loop. Thus, the joint formed by the enlargement and the inserted end of the strap-like member conforms approximately to the periphery of a large component or bundle as well as to a relatively small one. As a result minimal distortion of the head or enlargement, hence of the aperture 34a, occurs which could impair the holding efficiency due to the bulge effect and due to frictional grip.

When using tying devices of the type illustrated in FIGURES 10 to 17, inclusive, for temporary tying applications wherein the tie is to be removable for reuse, it is desired to employ a rubber-like material, the surface of which is made fairly smooth in comparison with the surface which is preferred for applications in which the securement is to be permanent.

A particularly useful form of the invention for the securing or mounting of cylindrical electrical components on a panel, especially when such components are to be held in place very securely and out of electrical contact with the panel, is that illustrated in FIGURES 18 through 20. In this instance, the enlargement 36 carried by, preferably integrally with, the strap-like member 38, is in the form of a cradle which is flat on its lower side 36a and which is arcuately concave on its upper side 36b facing in the direction along the length of the strap-like member. The end portion 36c has an outside face which is substantially flush with one face of the strap-like member 36 whereas the opposite end portion 36d has a aperture 36d′ therein which in the relaxed condition of the tying device has its axis extending substantially parallel to the strap-like member 38 (FIGURE 18). The entrance of the aperture 36d′ at the end thereof which faces in the direction in which the cradle faces is preferably flared for ease of insertion of the tapered end portion 38a of the strap-like member. The enlargement 36 is located generally intermediate the ends of the strap-like member, that end 38b opposite the end 38a also being of a similarly tapered form. The two ends taper substantially to a point for ease of insertion in apertures formed in a panel 40. In this instance, the apertures 40a, 40b in the panel 40 are or may be of circular form even though the strap-like member 38 is of generally rectangular cross section. However, it will be recognized that apertures of generally rectangular form may also be used and indeed are preferable, although somewhat more difficult to form by conventional machining processes.

In this instance, an electrical component such as the condenser C to be secured to the panel 40 is laid in the cradle of, for instance, two similar securing devices and the strap-like members thereof are looped around the component, the ends 38a passing through the apertures 36d′. The loops are tightened and tapered ends 38a and 38b then passed through the apertures 40a and 40b in the panel 40. Thereupon these ends are stretched and drawn progressively through the panel apertures until the desired tension is established in the end portions of the strap-like member, thereby also drawing the flat lower sides of the members 36 into firm contact with the face of the panel. Thereupon release of the end portions produces the familiar bulging action described above and completes the securement. The entire operation may be carried out here as in the preceding examples in a matter of a fraction of a minute by skilled hands. The securement is permanent and, because of the use of the cardle-like enlargements, no cementing material (D) is necessary as in the illustration in FIGURE 2, in order to impart extra rigidity and strength to the mounting for the component C.

These and other variations and modifications of the invention will be evident to those skilled in the art based upon an understanding of the foregoing description and the illustrations of the invention depicted in the drawings.

I claim as my invention:

1. A tie-down for securing electrical components and the like to a rigid panel having a retaining aperture therein, said tie-down comprising means to embrace and hold an electrical component, including an elongated flexibly elastic strap-like member to extend at least partly around the component and grip the same tightly by tension in said strap member, said strap-like member having a predetermined cross section intermediate its ends, in its relaxed condition, materially exceeding that of the aperture, said elastic member being tapered gradually from said predetermined cross section substantially to a point at one end, with the cross section at said point being materially less than that of the aperture, whereby the tapered end may be inserted through the aperture to stretch and thereby progressively draw the member through such aperture until the member is thereby stretched under tension around the component, whereupon release of the stretched member's end portion is accompanied by bulging thereof immediately against the aperture rim, preventing its retraction back through the aperture and retaining tension by which the member grips the component, said means to embrace and hold an electrical component comprising an elongated elastic strap carrying an enlargement of a cross section materially exceeding said predetermined cross section, with an intermediate portion of said predetermined cross section being interposed, immediately adjoining said enlargement, between said tapered end portion and said enlargement than said predetermined cross-section having an aperture materially smaller in cross section of the strap member and with the axis of said aperture extending generally transverse to the length of the strap member immediately adjoining said enlargement, to pass said tapered end portion, and a grommet-like member of relatively inflexible material embedded in the enlargement, said latter member having an aperture in registry with the aperture in the enlargement and of substantially the same size and general form as the enlargement aperture.

2. An electrical component banding device comprising an elongated flexibly elastic strap-like member having a predetermined cross section intermediate its ends, in its relaxed condition, said member being tapered gradually from said major cross section substantially to a point at one end, and carrying an enlargement on said member remote from said tapered end, said enlargement having an aperture therein of a size materially less than said predetermined cross section, permitting insertion of said tapered end point through such aperture to form an encircling band, whereupon said member may be stretched and drawn through said aperture, thereby to produce tension in the member encircling an electrical component, and, upon release of such end portion, retention of such tension by bulging of the member immediately against the aperture rim to prevent its withdrawal back through the aperture, said enlargement being formed integrally with the strap-like member, and a metal grommet-like aperture reinforcing element retained in such enlargement to form an aperture of rigid form and size.

3. A banding device for electrical components and the like comprising a molded one-piece elongated flexibly elastic strap-like member having a predetermined cross section intermediate its ends, one end portion of said member being tapered to a reduced cross section, said member having an enlargement thereon remote from said tapered end portion, said enlargement having an aperture therein through which the strap-like member may be drawn by inserting the tapered end portion through said aperture and then drawing said strap-like member progressively through said aperture to form a loop, said enlargement having a metal insert element therein located in said aperture to restrict the opening therethrough to a dimension smaller than the corresponding dimension of the aforementioned predetermined cross section of the strap-like member and thereby to maintain the strap-like member constricted at said location to impede withdrawal thereof back through said aperture.

4. The banding device defined in claim 3, wherein the enlargement on the strap-like member comprises an integral head thereon with the aperture therein extending through said head in a direction generally transverse to the longitudinal extent of the strap-like member where it joins said enlargement.

5. The banding device defined in claim 4, wherein the element comprises an encircling grommet-like member bearing against all sides of the strap-like member where it passes through the aperture at the aforesaid location.

6. A banding device for electrical components and the like comprising a molded one-piece elongated flexibly elastic strap-like member having a predetermined cross section intermediate its ends, one end portion of said member being tapered to a reduced cross section, said member having an enlargement thereon remote from said tapered end portion, said enlargement having an aperture therein through which the strap-like member may be drawn by inserting the tapered end portion through said aperture and then drawing said strap-like member progressively through said aperture to form a loop, said enlargement having an insert element therein of a material which is substantially harder than the material of the strap-like member located in said aperture to restrict the opening therethrough to a dimension smaller than the corresponding dimension of the aforementioned predetermined cross section of the strap-like member and thereby to maintain the strap-like member constricted at said location to impede withdrawal thereof back through said aperture.

References Cited by the Examiner

UNITED STATES PATENTS

| 876,402 | 1/08 | Schacht | 132—44 |
|---|---|---|---|
| 2,209,403 | 7/40 | Kittner et al. | 18—59 |
| 2,645,340 | 7/53 | Dow | 206—80 |
| 2,884,214 | 4/59 | Wrobel | 248—74 |
| 2,915,268 | 12/59 | Wrobel | 248—74 |

FOREIGN PATENTS

| 1,052,641 | 9/53 | France. |
|---|---|---|
| 1,126,581 | 7/56 | France. |

CLAUDE A. LE ROY, *Primary Examiner.*

UNITED STATES PATENT OFFICE
CERTIFICATE OF CORRECTION

Patent No. 3,197,164                                        July 27, 1965

Claude A. Hansen

It is hereby certified that error appears in the above numbered patent requiring correction and that the said Letters Patent should read as corrected below.

Column 9, lines 11 and 12, strike out "enlargement than said predetermined cross-section having an aperture materially smaller in cross section of" and insert instead -- enlargement having an aperture materially smaller in cross section than said predetermined cross-section of --.

Signed and sealed this 15th day of February 1966.

(SEAL)
Attest:

ERNEST W. SWIDER
Attesting Officer

EDWARD J. BRENNER
Commissioner of Patents